US012761641B2

(12) United States Patent
Inoue et al.

(10) Patent No.: US 12,761,641 B2
(45) Date of Patent: Oct. 13, 2026

(54) INFORMATION PROCESSING DEVICE AND MACHINE TOOL

(71) Applicant: DMG MORI CO., LTD., Nara (JP)

(72) Inventors: Takashi Inoue, Hokkaido (JP); Junichiro Okuno, Hokkaido (JP)

(73) Assignee: DMG MORI CO., LTD., Nara (JP)

( * ) Notice: Subject to any disclaimer, the term of this patent is extended or adjusted under 35 U.S.C. 154(b) by 547 days.

(21) Appl. No.: 17/974,692

(22) Filed: Oct. 27, 2022

(65) Prior Publication Data

US 2023/0043666 A1 Feb. 9, 2023

Related U.S. Application Data

(63) Continuation of application No. PCT/JP2021/030012, filed on Aug. 17, 2021.

(30) Foreign Application Priority Data

Aug. 24, 2020 (JP) ................................ 2020-141250

(51) Int. Cl.
*G05B 19/43* (2006.01)
*G06T 7/00* (2017.01)

(52) U.S. Cl.
CPC ............ *G05B 19/43* (2013.01); *G06T 7/0004* (2013.01); *G05B 2219/49348* (2013.01); *G06T 2207/30136* (2013.01)

(58) Field of Classification Search
None
See application file for complete search history.

(56) References Cited

U.S. PATENT DOCUMENTS 10,307,876 B2 6/2019 Okuda
12,236,578 B2 * 2/2025 Kanto ..................... G06T 7/001
12,325,100 B2 * 6/2025 Nakajima .......... B23Q 11/0075
12,586,198 B2 * 3/2026 Smith ........................ G06T 7/10
2003/0184720 A1 * 10/2003 Heerens .................. G03F 7/707 355/53
2005/0172984 A1 * 8/2005 Schweitzer ......... C23C 16/4407 134/26

(Continued)

FOREIGN PATENT DOCUMENTS

JP H03-184747 A 8/1991
JP H10-180585 A 7/1998

(Continued)

OTHER PUBLICATIONS

International Search Report issued for the prior international application No. PCT/JP2021/030012 mailed on Oct. 12, 2021.

*Primary Examiner* — Jennifer L Norton
(74) *Attorney, Agent, or Firm* — IP Business Solutions, LLC

(57) ABSTRACT

A process includes: (i) receiving image data, dividing a portion of the image data into a plurality of grids including a first grid, a second grid, a third grid, and a fourth grid, dividing the portion of the image data into a plurality of areas including (a) a first area including the first grid and the third grid, and (b) a second area including the second grid and the fourth grid; (ii) detecting an object relating to the first grid; and (iii) when the object is detected in the first grid, generating a signal for controlling discharge of fluid from a fluid discharging unit so that fluid flows through the first area including the first grid.

7 Claims, 10 Drawing Sheets

(56) References Cited

U.S. PATENT DOCUMENTS

| | | | | |
|---|---|---|---|---|
| 2008/0271750 | A1* | 11/2008 | Jansen | B08B 3/12 134/201 |
| 2009/0082979 | A1* | 3/2009 | Sato | G01R 31/2831 702/59 |
| 2009/0139540 | A1* | 6/2009 | Lau | B08B 7/0035 134/1.1 |
| 2011/0305392 | A1* | 12/2011 | Kapoor | G06F 18/211 382/190 |
| 2013/0004081 | A1* | 1/2013 | Baba | G06V 20/40 382/195 |
| 2013/0229516 | A1* | 9/2013 | Jones | G01N 21/35 348/143 |
| 2013/0259383 | A1* | 10/2013 | Kondo | G06V 30/148 382/199 |
| 2015/0107624 | A1* | 4/2015 | Sumiyoshi | B23Q 11/0075 250/461.1 |
| 2016/0184947 | A1 | 6/2016 | Itou | |
| 2016/0263687 | A1* | 9/2016 | Matsunaga | B08B 9/00 |
| 2016/0263745 | A1 | 9/2016 | Shirahata | |
| 2017/0043442 | A1 | 2/2017 | Takikawa | |
| 2017/0131721 | A1* | 5/2017 | Kwak | G05D 1/0274 |
| 2017/0144262 | A1 | 5/2017 | Okuda | |
| 2017/0165803 | A1* | 6/2017 | Nakayama | G06F 18/22 |
| 2018/0074508 | A1* | 3/2018 | Kleiner | A47L 9/0488 |
| 2019/0039198 | A1 | 2/2019 | Sugiura | |
| 2019/0347801 | A1* | 11/2019 | Ellison | G06T 7/174 |
| 2021/0138660 | A1* | 5/2021 | Miyawaki | B23Q 17/20 |
| 2021/0142458 | A1* | 5/2021 | Miyawaki | B08B 13/00 |
| 2021/0217164 | A1* | 7/2021 | Weese | G06N 20/00 |
| 2022/0402082 | A1* | 12/2022 | Kanto | B23Q 11/0042 |
| 2023/0144591 | A1* | 5/2023 | Nakajima | B23Q 11/0075 700/160 |
| 2025/0377908 | A1* | 12/2025 | Jiang | G06F 9/451 |
| 2026/0001237 | A1* | 1/2026 | Oba | B25J 13/087 |

FOREIGN PATENT DOCUMENTS

| | | | | |
|---|---|---|---|---|
| JP | 3502422 | B2 | 3/2004 | |
| JP | 2016-120589 | A | 7/2016 | |
| JP | 2016-168661 | A | 9/2016 | |
| JP | 2018-024094 | A | 2/2018 | |
| JP | 6367782 | B2 | 7/2018 | |
| JP | 2019-028004 | A | 2/2019 | |
| JP | 2019-030917 | A | 2/2019 | |
| JP | 2020120922 | A * | 8/2020 | A61B 5/7415 |

* cited by examiner

INFORMATION PROCESSING DEVICE AND MACHINE TOOL

BACKGROUND OF INVENTION

1. Field

The present invention relates to an information processing device.

2. Description of Related Art

In the above-mentioned technical field, Patent Literature 1 discloses a technique for detecting a place where chips generated in processing adhere and accumulate.

RELATED ART LIST

Patent Literature 1: JP 6367782 B

However, since the technique described in the above document detects chips by a heat detector instead of a visual sensor such as a camera, the detection accuracy of chips is not sufficient.

It is an object of the present invention to provide a technique for solving the above problem.

SUMMARY

In order to achieve the above object, the present invention has the configuration described in the claims.

According to the present invention, objects in the machine tool can be detected with high accuracy.

DETAILED DESCRIPTION

Figure 1:
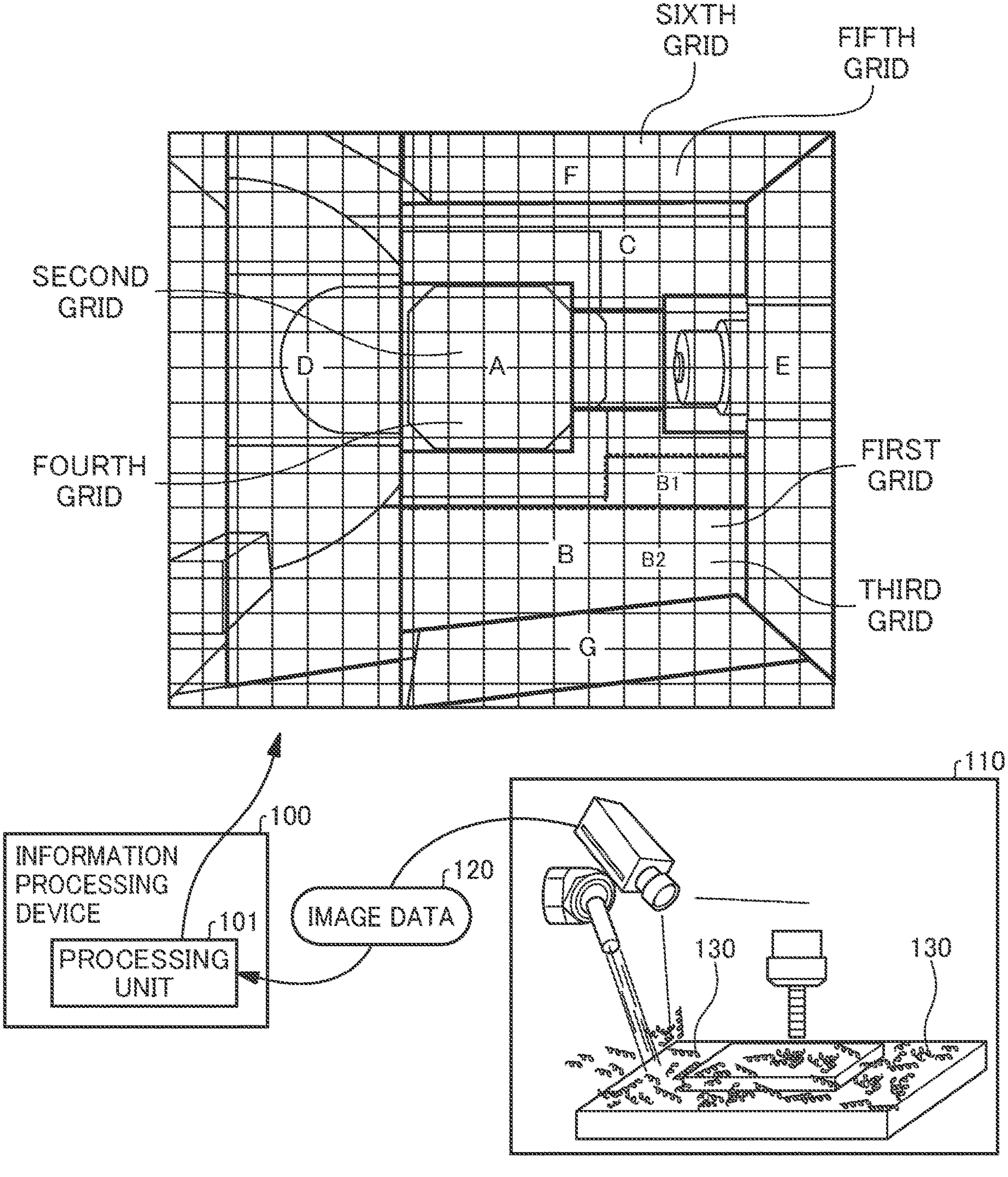
FIG. 1 is a block diagram illustrating a configuration of an information processing device according to a first embodiment.

Embodiments will now be described in detail by way of example with reference to the drawings. However, the constituent elements described in the following embodiments are merely illustrative, and the scope of the present invention is not intended to be limited thereto.

First Embodiment

An information processing device 100 according to a first embodiment will be described with reference to FIG. 1. The information processing device 100 is a device for detecting an object 130 in a machine tool 110. Examples of the object 130 include chips as well as powders and lumps of raw materials remaining in the machine tool after additional processing. The object 130 is to be removed by cleaning and may be referred to as a removal object.

The information processing device 100 includes a processing unit 101. The processing unit 101 detects the object 130 from the inside of the machine tool 110 by using image data 120 obtained by imaging the inside of the machine tool 110.

The processing unit 101 associates the image data 120 with grid information that divides the image data into a plurality of grids including a first grid, a second grid, a third grid, and a fourth grid, and also to area information that divides the inside of the machine tool into a plurality of area including a first area (area B) including the first grid and the third grid and a second area (area A) including the second grid and the fourth grid.

A plurality of grids are used to detect the presence degree of an object in one grid (object presence or absence, object amount, and object existence probability, among others). The plurality of areas are areas divided according to the structures in the machine tool, and are used to move the object in an area out of the area by discharging fluid in each area. Therefore, when the grid information and the area information are superimposed on the image, a plurality of grids are included in one area. For example, in FIG. 1, Area B includes the first grid and the third grid. Area B further includes a plurality of other grids. In addition, one aggregate obtained by collecting a plurality of grids may be defined as one area.

For example, when an object is detected in the first grid, and the first grid in which the object is detected is included in the first area (area B), the processing unit 101 transmits a signal to the machine tool for instructing the discharge of fluid in order to move object remaining on a structure in the machine tool corresponding to the first area (area B).

According to the above configuration, since the object can be accurately detected from the image obtained by imaging the inside of the machine tool, the object in the machine tool can be accurately moved. As a result, it is possible to reduce the time for removing the object in the machining area of the machine tool. Furthermore, this eliminates the necessity of the removal work of the object by a human operator or reduces the number of times of the removal work of the object by a human operator, thereby increasing the operation rate of the machine tool.

Second Embodiment

A machine tool system 200 according to the second embodiment will be described with reference to FIGS. 2A to 6. As shown in FIG. 2A, machine tool system 200 includes an information processing device 201 and a machine tool 202. Although the first embodiment describes an example in which the information processing device 201 is provided separately from the machine tool 202 as shown in FIG. 1, the information processing device 201 may be mounted in the machine tool 202. The information processing device 201 may be connected to the machine tool 202 via a network such as a local area network (LAN) or the Internet. The information processing device 201 may be, e.g., a server provided in a cloud.

Overall System Configuration

The machine tool 202 of this embodiment is a machine for performing machining process such as cutting and grinding on a workpiece 221 made of metal, wood, stone, resin, or the like by using a tool 223 attached to a tool spindle 222. However, the present invention is not limited to this form, and a machine tool for other removal processing or a machine tool for additional processing may be used. Further, the machine tool may be a combined machine tool in which these functions are combined. A coolant discharging unit 224 discharges coolant 225 to cool the tool 223 and the workpiece 221. Further, the coolant discharging unit 224 of the present embodiment may discharge the coolant 225 to effectively move the object. The object is, e.g., chips 226 generated during cutting the workpiece 221 with the tool 223. It should be noted that a liquid such as coolant or a gas such as air may be used, i.e., any fluid may be used. Therefore, instead of the coolant discharging unit 224, a fluid discharging unit such as an air blow unit for blowing air may be used. The fluid discharging unit may include a nozzle or the like capable of swinging in the X- and Z-directions.

The machine tool 202 further includes a camera 227, a control unit 228, and a coolant pump 229.

The camera 227 is an imaging unit that acquires image data by imaging the inside of the machine tool 202. Here, the camera 227 is provided as an example of the imaging unit.

The information processing device 201 includes a chip processing unit 211, an image reliability determination unit 212, and a notification unit 213.

The chip processing unit 211 detects the chips 226 which are removal objects to be removed from the inside of the machine tool 202 by using image data 210 obtained by imaging the inside of the machine tool 202 (in particular, the machining area) by the camera 227. Specifically, the image data 210 is divided into small areas (made into grids), and the presence or absence of the chips 226, e.g., the presence degree of chips is determined for each grid which is a small area. In the present embodiment, the image is divided for each grid, but the present invention is not limited thereto. The image data may not be divided, and the image and grid information divided into grids may be associated with each other.

Apart from the grid information, the chip processing unit 211 associates the image data with area information to be divided into a plurality of areas. The plurality of areas are areas divided according to the structures in the machine tool 202, and are areas A, B, and the like shown in FIG. 1. The area divided as grids can be referred to as a small area, and the area A and the area B can be referred to as a middle area. As shown in FIG. 1, the area A is an image area including a pallet, and the area B is an image area including the bottom of a processing area located between a side cover and the pallet. An aggregate of a plurality of grids may be defined as one area. In this case, the diagonal lines dividing the areas superimposed and displayed on the image data example shown in FIG. 1 will be zigzag lines depending on the size of the grid rather than straight lines.

The chip processing unit 211 detects the presence degree of chips. In other words, the chip processing unit 211 performs chip detection. The concept of the presence degree of the chip includes, in addition to the presence or absence of the chips 226 in one grid (small area), chip size, chip amount, chip shape, chip type, and chip existence probability, among others in one grid (small area). The information on the size of chips, which presupposes the existence of chips, is an example of the presence degree of chips. The chip processing unit 211 may detect a plurality of pieces of information such as a chip size and a chip type.

The chip processing unit 211 extracts the feature of the image data 210. The feature extracted by the chip processing unit 211 includes the information amount, frequency component, contrast, and luminance distribution of the captured image. The chip processing unit 211 has a function of improving detection accuracy by performing machine learning with a neural network on a large number of training images about which the presence or absence of chips is known.

The control unit 228 controls imaging with the camera 227 while controlling the coolant pump 229. For example, the control unit 228 controls the coolant pump 229 to stop the discharge of the coolant 225, controls the camera 227 to perform imaging, and controls the coolant pump 229 to discharge the coolant again after imaging. With respect to the coolant discharge operation, the processing unit 301 generates a signal that instructs the discharge of fluid in order to move objects remaining on a structure (e.g., the pallet) in the machine tool 202 corresponding to an area (e.g., area A) that is divided according to the structures in the machine tool 202. The control unit 228 performs polling process for periodically inquiring a signal to the processing unit 301 and controls the coolant pump 229 to cause discharge of the coolant 225 upon acquiring a signal of the fluid discharge command. In addition, the control unit 228 controls the fluid discharging unit including the nozzle and the swinging mechanism in accordance with the fluid discharge command, and causes the nozzle to swing toward the area to be cleaned. Similarly in the case of the first embodiment, the processing unit 101 generates a signal that instructs the discharge of fluid in order to move objects remaining on a structure (e.g., the pallet) in the machine tool 110 corresponding to an area (e.g., area A) that is divided according to the structures in the machine tool 202.

Further, the control unit 228 determines the timing of imaging for chip detection according to a machining program (G code) or a user operation. The control unit 228 may turn off the coolant pump 229 to image the chips, e.g., at a brake in machining during running (a timing at which another surface of the workpiece is cut), at a timing of replacing a tool by an ATC, or at a timing instructed by a user.

The control unit 228 controls the coolant discharging unit 224 on the basis of the position of the chips detected by the chip processing unit 211 (the grid on which the chips are detected), the amount of chips in one grid, and the amount of chips in one area, among others to effectively discharge the coolant.

To move the chips 226 toward a shooter 230, the control unit 228 controls the coolant discharging unit 224 so that the coolant flushes the chips 226 as if the chips 226 are swept out by a broom.

The chip processing unit 211 might make an erroneous determination (inference) due to brightness/darkness of lighting, contrast, and mist, among other causes. If the inference is wrong, chips might not be removed even though they are present, or conversely, wasteful removal might be attempted even though chips are absent.

Therefore, the image reliability determination unit 212 calculates the reliability of the image (image reliability)

from the characteristic factors of the image data that affect the inference result as an indicator indicating whether the inference by the chip processing unit 211 is appropriate. In other words, the image reliability determination unit 212 determines the image reliability indicating whether the image data 210 is not suitable for detecting the chip 226 on the basis of the feature of the image data 210.

The notification unit 213 provides a notification indicating that the image data 210 is not suitable for the detection of the chips 226 on the basis of the determination result of the image reliability determination unit 212 to the user. A display control unit 320 performs processing for displaying image data (e.g., the upper portion of FIG. 1, FIG. 6, FIG. 7, and FIG. 8), a screen (e.g., FIG. 9) or the like on a display unit (touch panel, see FIG. 3) of the information processing device 201 or a display unit 251 of an operation panel 250 provided on the machine tool 202.

Image Reliability

The image reliability determination unit 212 uses three indicators of brightness/darkness, blur level, and density of mist as the image reliability. Specifically, the image reliability determination unit 212 includes a brightness/darkness determination unit 231, a blur determination unit 232, and a mist determination unit 233, and determines whether the estimation accuracy of chip detection is decreased due to the effects of brightness/darkness, blur, and mist. Here, the threshold values for the brightness/darkness determination, the blur level determination, and the mist determination may be changed according to the environment.

Each image reliability is calculated by image characteristic factors such as luminance value, frequency distribution, contrast, and combinations thereof. Then, it is determined whether the chip processing unit 211 functions appropriately on the basis of the magnitude of the image reliability value (0 to 1). When the image reliability of the image data to be determined is low, inappropriate chip removal behavior can be avoided by not using the image data. If the image reliability is decreased due to sudden and transient factors only, the image reliability is expected to improve over time.

Although the present embodiment uses the above three indicators as the image reliability, the present invention is not limited thereto, and other indicators (e.g., sharpness, contrast, number of gradations, noise amount, number of pixels with white out, number of pixels with black out, and peak signal-to-noise ratio) may be used.

If the image reliability has been decreased for a certain period of time, a notification indicating this is provided to the user by, e.g., displaying an alert. Thus, the user can recognize that the chip processing unit 211 does not function appropriately, and can attempt to improve the environment. Specifically, the chip processing unit 211 can be made to function appropriately by performing, e.g., maintenance of the camera 227, review of imaging conditions, cleaning of the lens, change of lighting, installation and operation of the mist collector.

Brightness/Darkness Determination

The brightness/darkness determination unit 231 determines that the image data is not suitable for chip detection because the image data is too bright or too dark. Specifically, the brightness/darkness determination unit 231 uses the luminance of the image to monitor the brightness/darkness of the image. More specifically, the average value of the luminance is used as an indicator value of brightness/darkness and compared with a threshold value. When the state in which the indicator value of brightness/darkness is smaller or larger than the threshold value continues for a certain period of time, the notification unit 213 is made to provide a notification indicating that the image data is not suitable for the detection of chips due to being too bright or too dark. In this case, the notification unit 213 provides a notification such as "The image is too dark for chip detection. Check the operation status of the light." or "The image is too bright for chip detection. Check the aperture of the camera."

Blur Determination

The blur determination unit 232 determines that the image data is not suitable for detection of chips due to blur of the image data. Specifically, the blur level of an image is monitored by using a value obtained by normalizing the maximum value (maximum gradient) of the image data subjected to a differential filter (Sobel filter) to a range of 0 to 1. Alternatively, blur may be determined by acquiring an optical transfer function (OTF, so-called response function) of an image data, and determining how much contrast can be maintained at what spatial frequency (amplitude characteristics, MTF: modulation transfer function).

When the indicator of the blur level of the image remains below a predetermined threshold value for a certain period of time, the notification unit 213 provides a notification indicating that the image is not suitable for detection of the removal object due to lack of focus. In this case, the notification unit 213 provides a notification such as "Chip detection is impossible due to blur. Check the lens of the camera."

Mist Determination

The mist determination unit 233 determines that an image captured in this state is unsuitable for detecting chips due to the density of mist generated when a workpiece or a tool is cooled by coolant discharged in the machine tool.

Specifically, the mist determination unit 233 calculates an indicator of the density of the mist from a combination of the luminance value, frequency distribution, and contrast of the image. In particular, in the present embodiment, the product of three features of "darkness degree", "edge amount", and "contrast" is used as a mist indicator. This is because any one of these features decreases as the degree of mist increases. The "darkness degree", "edge amount", and "contrast" are calculated from the original image data before grid division.

Increased mist will lead to erroneous determination that there is no chip so that when the indicator value of the mist is smaller than the threshold value for a certain period of time, the notification unit 213 provides a notification indicating that the image is not suitable for detection of chips due to the density of the mist of the coolant. For example, the notification unit 213 provides a notification such as "Chip detection is impossible due to dense mist. Check the operation status of the mist collector."

Here, as an example, three features of "darkness degree", "edge amount", and "contrast" are defined as follows.

"Darkness degree"=a value calculated by normalizing average luminance in pixels to a range of 0 to 1 and then subtracting the obtained value from 1.

"Edge amount"=a value calculated by normalizing Sobel max, which is the maximum value (maximum difference) of image data subjected to a differential filter (Sobel filter), to a range of 0 to 1 by setting the theoretical maximum value to 1140

"Contrast"=a value obtained by normalizing the work amount of contrast correction (luminance histogram flattening) to a range of 0 to 1 by setting the maximum value to 255

Figure 2A:
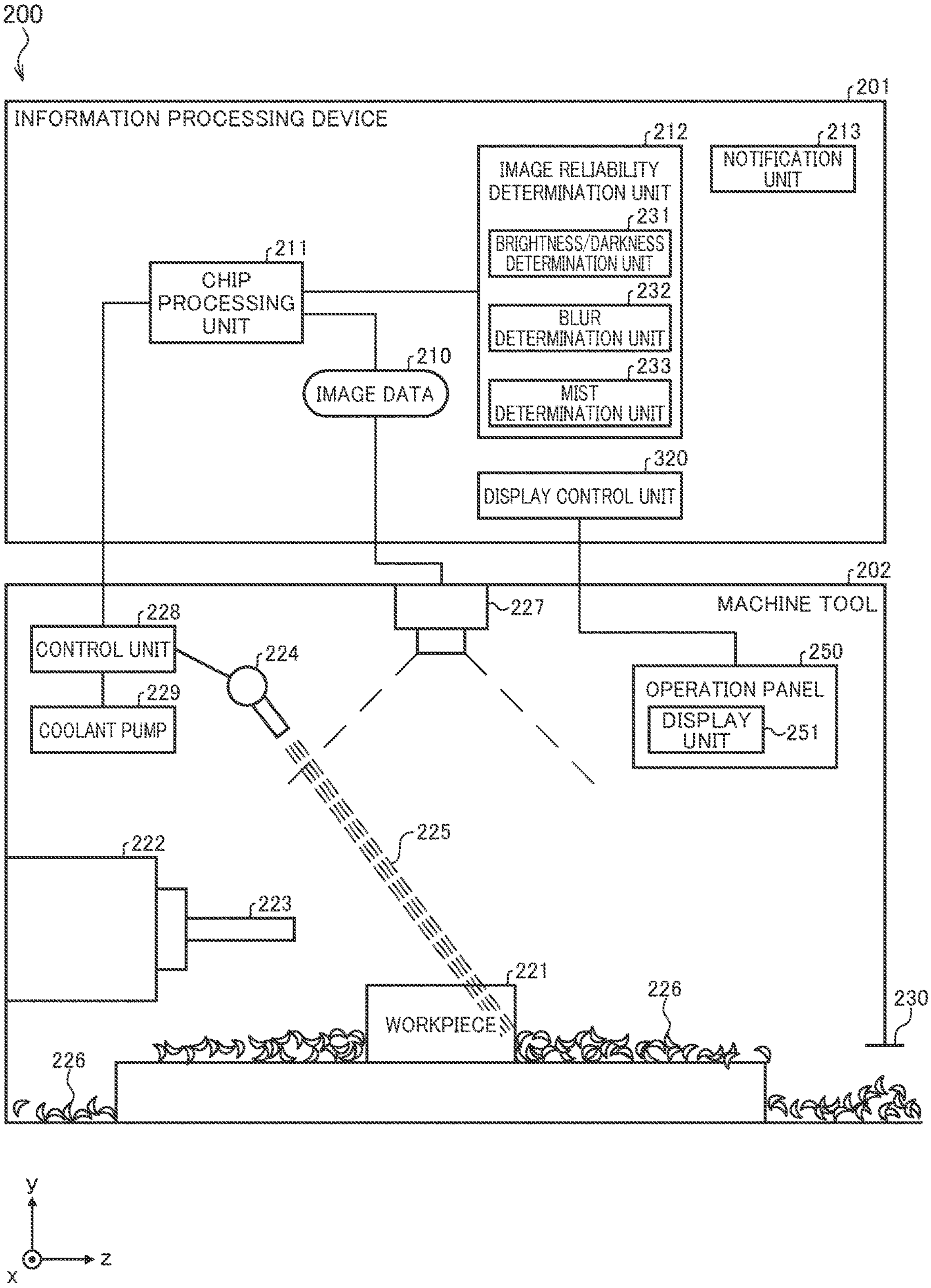
FIG. 2A is a block diagram illustrating a configuration of a machine tool system according to a second embodiment.
Figure 2B:
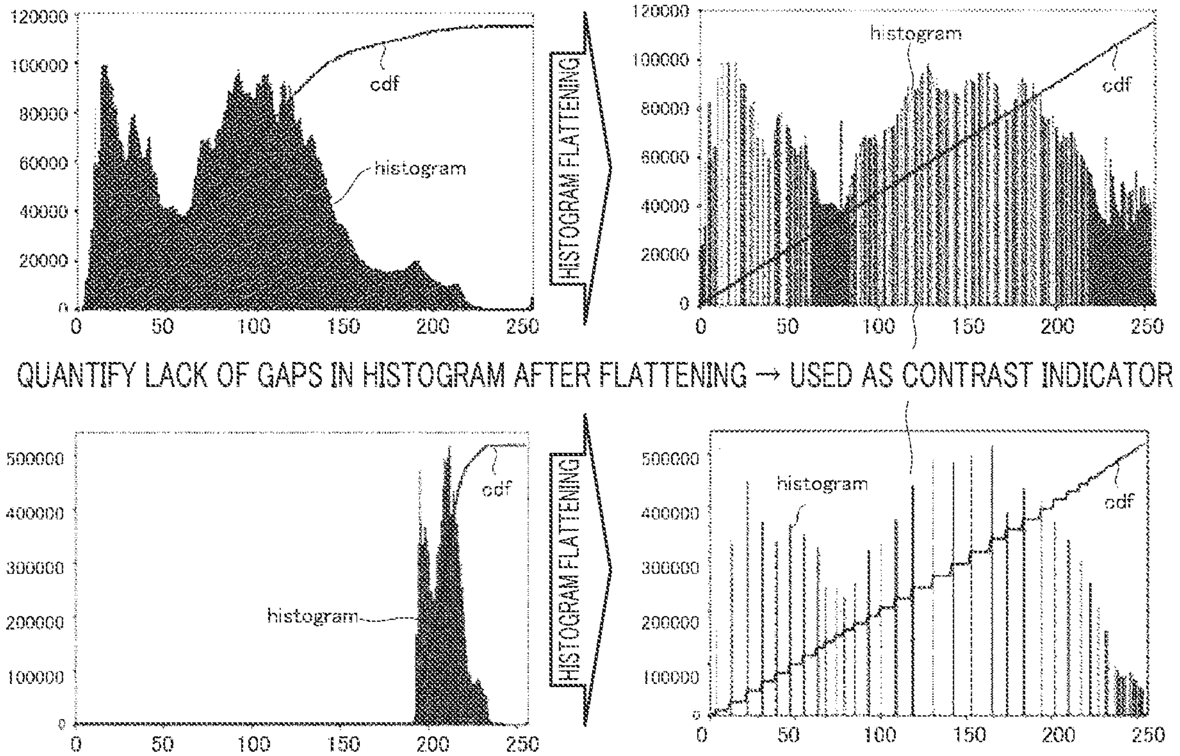
FIG. 2B is a diagram for explaining a contrast indicator used in the machine tool system according to the second embodiment.

The work amount of contrast correction (luminance histogram flattening) is obtained by flattening the luminance histogram and quantifying the lack of gaps in the histogram after the processing (the number of luminance values whose frequency is not zero) (FIG. 2B).

It is also possible to use the variance, standard deviation, or average value of the differential filter output as the "edge amount". As the "contrast", it is also possible to use luminance dispersion, luminance standard deviation, and Michelson contrast (a value calculated by using maximum luminance and minimum luminance of all pixels).

Furthermore, three features of "darkness degree", "edge amount", and "contrast" may be weighted and then integrated.

By performing the brightness/darkness determination, blur determination, and mist determination in the manner described above, it is possible to obtain a robust determination result by suppressing the influence of image variations.

Figure 3:
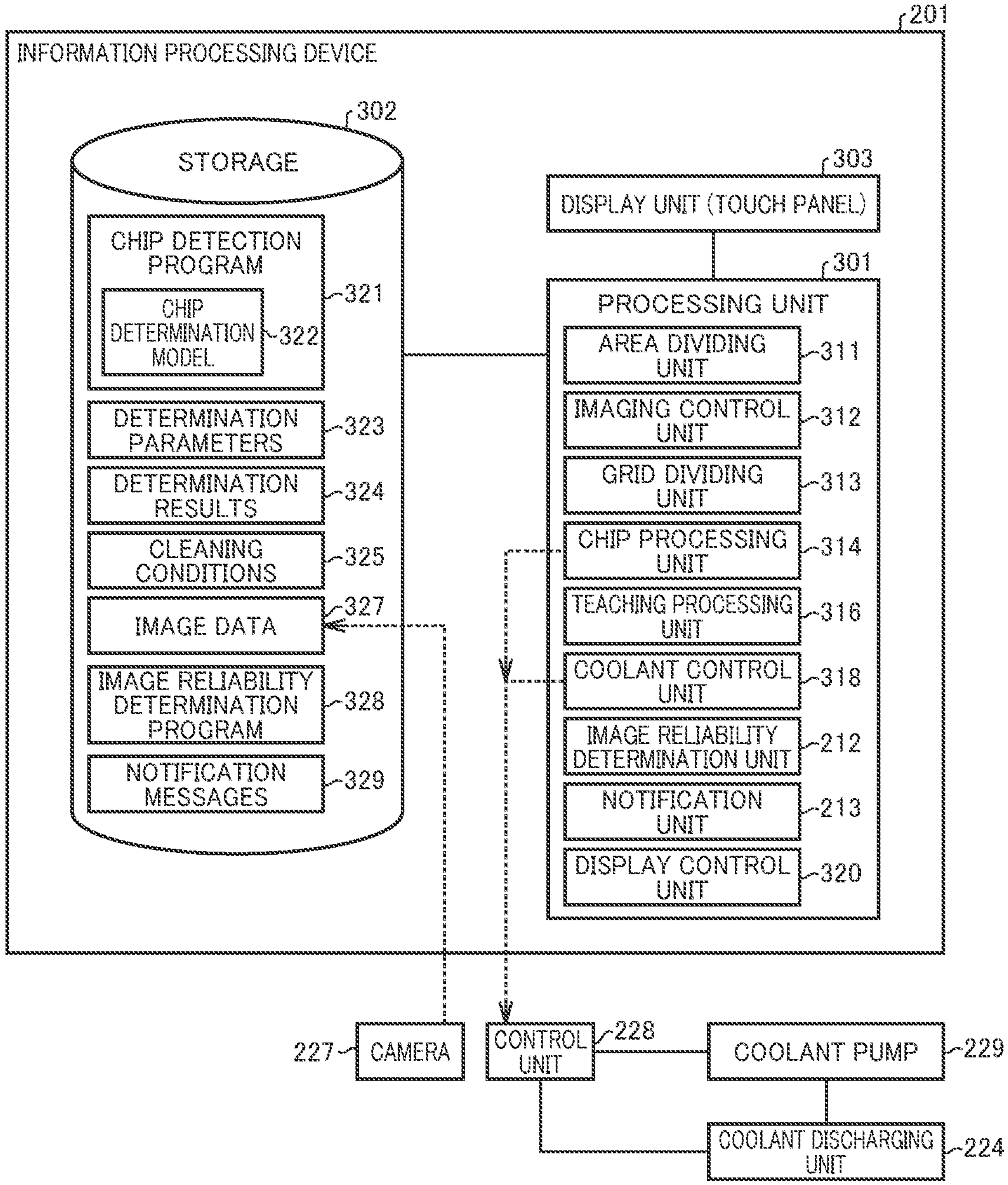
FIG. 3 is a block diagram illustrating a configuration of an information processing device according to the second embodiment.

FIG. 3 is a block diagram for explaining the internal configuration of the information processing device 201. The information processing device 201 of this embodiment includes a processing unit 301, a storage 302, and a touch panel 303. However, the present invention is not limited to this configuration. It will be sufficient for an information processing device to have at least the processing unit 301 for detecting an object. Instead of the display unit 303 such as a touch panel of a tablet terminal, the display unit 251 of the operation panel 250 of the machine tool may be used. A storage may be provided in an external server, and various data may be provided to the information processing device 201 via a network.

The processing unit 301 executes various kinds of operational processing to implement various kinds of functions. The storage 302 stores various data and functions as a working area when the processing unit 301 performs operational processing. Specifically, the storage 302 stores a chip detection program 321, determination parameters 323, determination results 324, cleaning conditions 325 (including cleaning path information according to the number of times of cleaning and the area), an in-machine image 327, an image reliability determination program 328, and notification messages 329.

The touch panel 303 has both an input function for accepting an instruction input from a user and a display function for displaying a chip determination result or the like.

The chip detection program 321 uses a chip determination model 322 formed by applying the determination parameters 323 to a learning/inference model. The determination parameters 323 are parameters for detecting chips, and are obtained by using a partial image (or an image portion corresponding to one grid) and information on chips as training data and making the learning/inference model learn the data in advance. The determination parameters 323 are stored for each of a plurality of different mesh sizes. Further, learning parameters which affect characteristics such as learning efficiency of the chip determination model 322 may be separately set in the storage 302.

Figure 4:
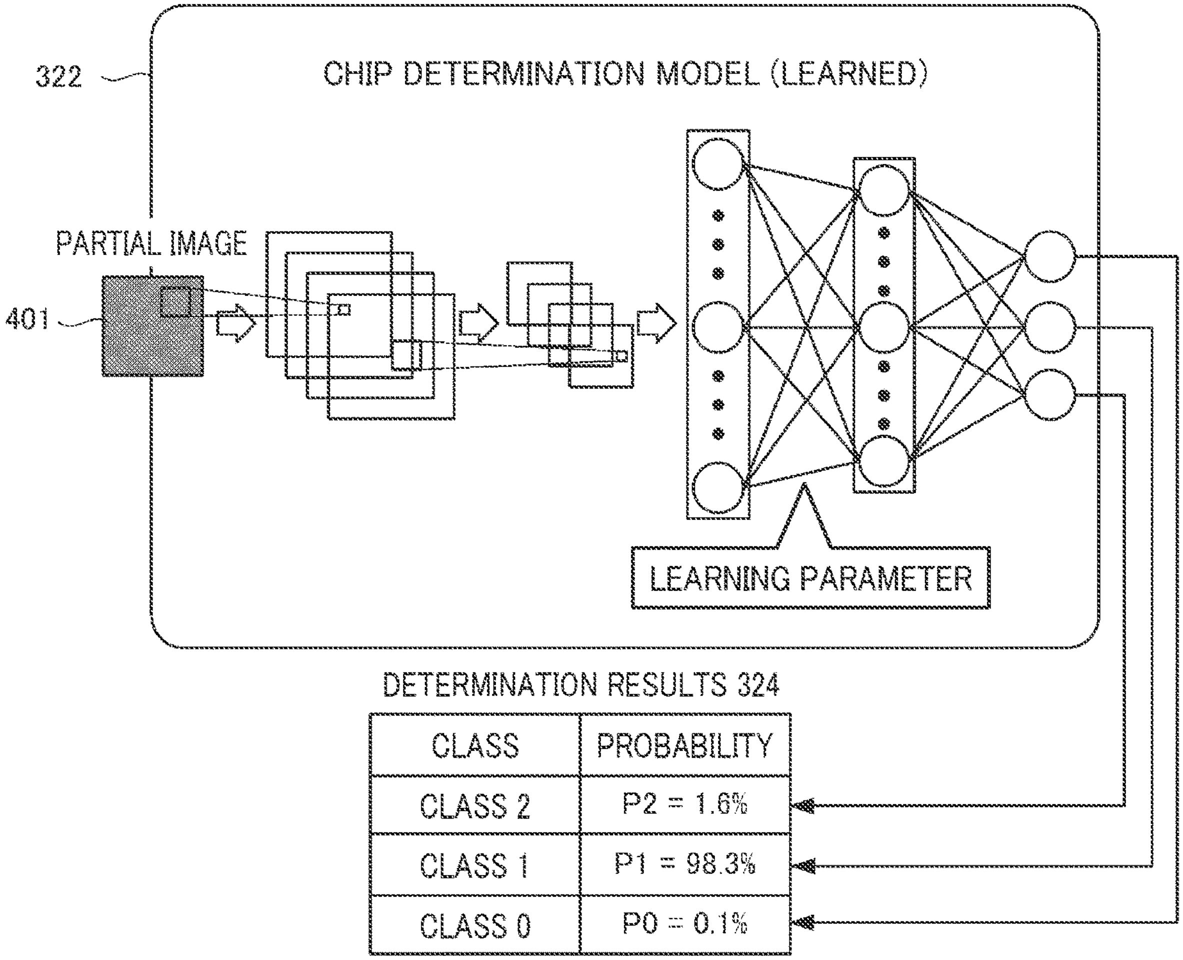
FIG. 4 is a diagram for explaining machine learning of the information processing device according to the second embodiment.

As shown in FIG. 4, the determination result 324 is the result of executing the chip detection program on a partial image 401 (image portion corresponding to one grid) obtained by dividing the image 327 into grids. For example, the chip determination model 322 uses the concept of "class" as the determination result 324. This "class" is determined by comprehensively taking into account the amount, density, size, length, and shape, among others of chips. More specifically, a result will be classified into a lower class as the chip cleaning is easier since the chips are few, sparse, small, short, and hard to be trapped, and a higher class as the chip cleaning is harder since the chips are many, dense, large, long, and easy to be trapped. For each class, the probability of the class is stored as the determination result 324. For example, when three classes of "class 0" indicating no chip, "class 1" indicating few chips, and "class 2" indicating many chips are defined, a probability P0 of "class 0", a probability P1 of "class 1", and a probability P2 of "class 2" are stored for each partial image.

Referring back to FIG. 3, the cleaning conditions 325 include information such as conditions for determining whether chip cleaning is necessary and the number of times of cleaning. For example, the number of times of cleaning includes the number of times of continuous cleanings, which is the number of times of execution of continuous cleaning of the inside of the machine, and the number of times of local continuous cleaning, which is the number of times of execution of continuous cleaning of each mesh area.

The processing unit 301 is implemented by, e.g., a central processing unit (CPU). By executing the chip detection program 321, the processing unit 301 can function as an area dividing unit 311, an imaging control unit 312, a grid dividing unit 313, a chip processing unit 314, and a coolant control unit 318. The processing unit 301 can also function as the image reliability determination unit 212 and the notification unit 213 by executing the image reliability determination program 328.

The imaging control unit 312 outputs an imaging control signal to the camera 227 at a preset imaging timing, acquires the image 327, and stores the image 327 in the storage 302. The imaging timing is, e.g., a timing between operational steps, a timing of a tool exchange, a certain time interval, and a timing at which a predetermined machining amount is reached.

The grid dividing unit 313 divides the image data of the in-machine image into grids so as to be handled as a partial image, and associates the image data with the grid information. Thus, it is possible to detect chips for each grid, thereby accurately detect chips. The grid dividing unit 313 divides the image into partial images of a size determined on the basis of each size of the chip, workpiece, and jig. As a result, the edge shapes of the workpiece and the jig can be easily distinguished from the chips, and erroneous detection can be reduced. The grid is not limited to a square grid pattern (a square mesh), but may be a diamond, triangle, and honeycomb, among other shapes. Further, it is not necessary to divide all of the images into partial images, and only areas in which chips need to be detected may be divided.

As shown in FIG. 1, the area dividing unit 311 divides the image data into a plurality of areas including the first area (area B) and the second area (area A) according to the structures in the machine tool. For example, the area A is an area of image data including an image captured by pallet imaging, and the area B is an area relating to the bottom of the processing area. The areas F and G are areas of image data including images of a side wall of the machine tool or an opening/closing door provided on a side surface of the machine tool. The chips remaining in the machine tool include chips remaining on the pallet and chips sticking to a surface of the side wall. In order to efficiently move them, the method, direction, and discharge path (cleaning path) for discharging the coolant may be determined for each area. The method, direction, and discharge path (cleaning path) for discharging the coolant are included in the cleaning conditions 325 and stored in the storage 302.

Figure 6:
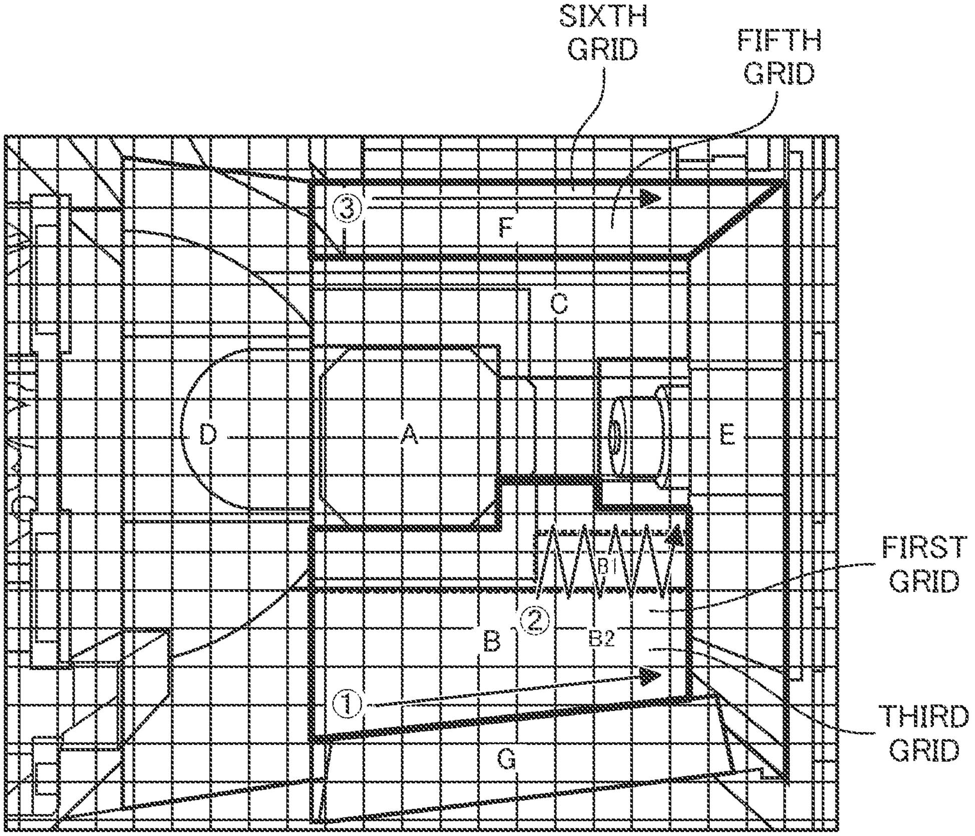
FIG. 6 is a diagram for explaining the state of chip discharge in the machine tool system according to the second embodiment.

By efficiently moving the chips toward the shooter, it is possible to reduce the accumulation of chips in a short time. The chips moved toward the shooter are discharged and removed to the chip box outside the machine tool via the chip conveyor. For example, the area B in FIG. 6 is the bottom of the processing area, and includes a horizontal surface B1 and an inclined surface B2 inclined to the horizontal surface. When chips are detected from the first grid corresponding to the inclined surface B2 in the area B, as shown in FIG. 6, the discharge path is controlled so that the coolant liquid flows linearly to the highest portion of the inclined surface B2. The coolant flows on the inclined surface B2 toward the horizontal surface B1, i.e., flows through the inclined surface B2 corresponding to the first grid on which the chips are detected. The chips are swept away by the coolant and arrive at the horizontal surface B1. After the end of the discharge of the coolant onto the inclined surface B2, the control unit 228 controls the discharge of the coolant into the horizontal surface B1 in a zigzag manner, and flushes the chips on the horizontal surface into the shooter. The flow method of the fluid to drop the chips downward from the upper portion and move the chips accumulated on the lower portion collectively to the shooter is efficient when there are few chips.

The chip processing unit 314 executes preprocessing for improving the determination accuracy, such as noise removal processing and image size conversion processing, for each partial image. Thereafter, the chip processing unit 314 executes the chip detection program 321 for each of the partial images to determine the presence or absence of chips by using the chip determination model 322, and stores the determination result 324.

The chip processing unit 314 uses, e.g., a convolutional neural network (CNN) which is a model specialized in image classification among deep learning techniques relatively resistant to environmental changes. However, other machine learning algorithms may be used.

When a machine learning algorithm such as a support vector machine (SVM) is used, filtering process or the like is performed on the partial images to calculate a shape feature of each partial image. The class may be determined for each of the partial images by inputting the shape feature into a learned chip determination model. In addition, non-machine learning algorithms such as deterministic algorithms may be used. For example, as the number of chips increases, partial images become more complex and tend to have higher image frequency components. Therefore, the chip processing unit 314 may perform frequency analysis such as fast Fourier transform (FFT) and compare the spectral statistics of each partial image with the determination parameters to determine the class. An entire area image without chips may be prepared in advance, and the difference image between this and the entire area image to be determined may be meshed and subjected to a fast Fourier transform to eliminate the environment-dependent components.

The chip processing unit 314 reads the determination result 324 of each partial image from the storage 302 and displays it on the touch panel 303. Specifically, each partial image is displayed in a manner in which the determination result can be identified (e.g., with a different color for each different determination result).

For example, each grid is classified into the following four groups according to the values of the determination probability P0 of class 0 (no chip exist) and the determination probability P1 of class 1 (chips exist), and is masked with different colors.

Group 1: P1 is 0 to 30% (P0 is 70 to 100%): red

Group 2: P1 is 30 to 50% (P0 is 50 to 70%): blue

Group 3: P1 is 50 to 70% (P0 is 30 to 50%): green

Group 4: P1 is 70 to 100% (P0 is 0 to 30%): yellow

Thus, e.g., when the determination probability of detecting chips in the first grid is 0.98, P1 is 98%, and the grid is displayed in yellow (group 4). When the determination probability of detecting chips in the second grid is 0.12, P1 is 12%, and the second grid is displayed in red. It should be noted that although the determination probability of detecting chips in the second grid is 0.12, it may be expressed as that P0 is 88%.

The user confirming the determination result from the image can touch and select any partial image that has been erroneously determined and input a correct determination result (another color). For example, the user can change a partial image that is colored as group 2 to group 1, and a partial image that is colored as group 3 to group 4. A teaching processing unit 316 corrects the determination result 324 of the storage 302 according to the change input of the determination result by the user.

The coolant control unit 318 controls the coolant pump 229 via the control unit 228. Specifically, the coolant control unit 318 tunes off the coolant pump 229 in an observation mode in which the state of the inside of the machine is imaged as it is and displayed on the touch panel 303, or in a chip detection mode in which the chip processing unit 211 tries to detect chips. Otherwise, the coolant control unit 318 controls the coolant discharging unit 224 via the control unit 228 in accordance with the determination result by the chip processing unit 314, and discharges the coolant to the target position. Whether each area should be cleaned is determined by whether the accumulation amount of each area has exceeded a threshold value (set value). The accumulation amount of each area is calculated from the determination result of each grid included in the area.

No chip: 0 points

Few chips: 3 points

Many chips: 8 points

Examples: Imaging of area A (consisting of 200 grids) and AI judgment result at a certain time point:

No chip×165, Few chips×30, Many chips×5→Accumulation score=30×3+8×5≈130>area A threshold value Then, the entire area A is cleaned.

That is, the processing unit 301 calculates a score on the existence probability of chips for each of a plurality of grids obtained by dividing a part of the image data. Then, the processing unit 301 defines an area including a predetermined number of grids, and determines, in an area by area manner, whether cleaning should be performed according to the total score in the whole area. In other words, when the total score of the areas divided according to the structures in the machine tool 202 exceeds a threshold value, the processing unit 301 generates a signal for controlling the discharge of fluid from the fluid discharging unit so that fluid flows through the areas, and transmits the signal to the control unit 228 of the machine tool 202. The above-described total score (also referred to as the "accumulation amount of the area" or "accumulation score") is an example of a "score relating to accumulation of the object in the area".

For example, it is assumed that chips are detected from the first grid and the third grid corresponding to the inclined surface B2 of FIG. 6. Then, the chip processing unit 314 acquires the area information divided by the area dividing unit 311, and transmits the information detected in the area B to the coolant control unit 318. The coolant control unit 318 transmits a signal to the control unit to control the cleaning in the area B in accordance with the cleaning condition so that the coolant liquid is discharged linearly on the inclined surface and then discharged zigzag on the horizontal surface. The control unit such as NC receives the signal transmitted from the coolant control unit 318 and drives a coolant nozzle according to the received signal to control the discharge direction and the discharge amount of the coolant liquid. That is, the coolant control unit 318 transmits a signal to the control unit so as to discharge the coolant in accordance with the path of the coolant to be discharged to the portion of the machine tool corresponding to the area. The path of the coolant is also for washing away the chips in the machine tool, and is also called a cleaning path. For example, in an area F including a side surface of a machine tool, when chips are detected in the fifth grid, the cleaning path is set so as to flow the coolant in a straight line in the horizontal direction at the side surface position of the machine tool corresponding to the sixth grid where the height of the side surface is high. In this way, the cleaning path is set for each area and stored in the storage. For example, a zigzag cleaning path is set for the area A corresponding to the image area including the pallet. On the other hand, a straight cleaning path is set for side surfaces such as the area G and the area F.

Figure 5:
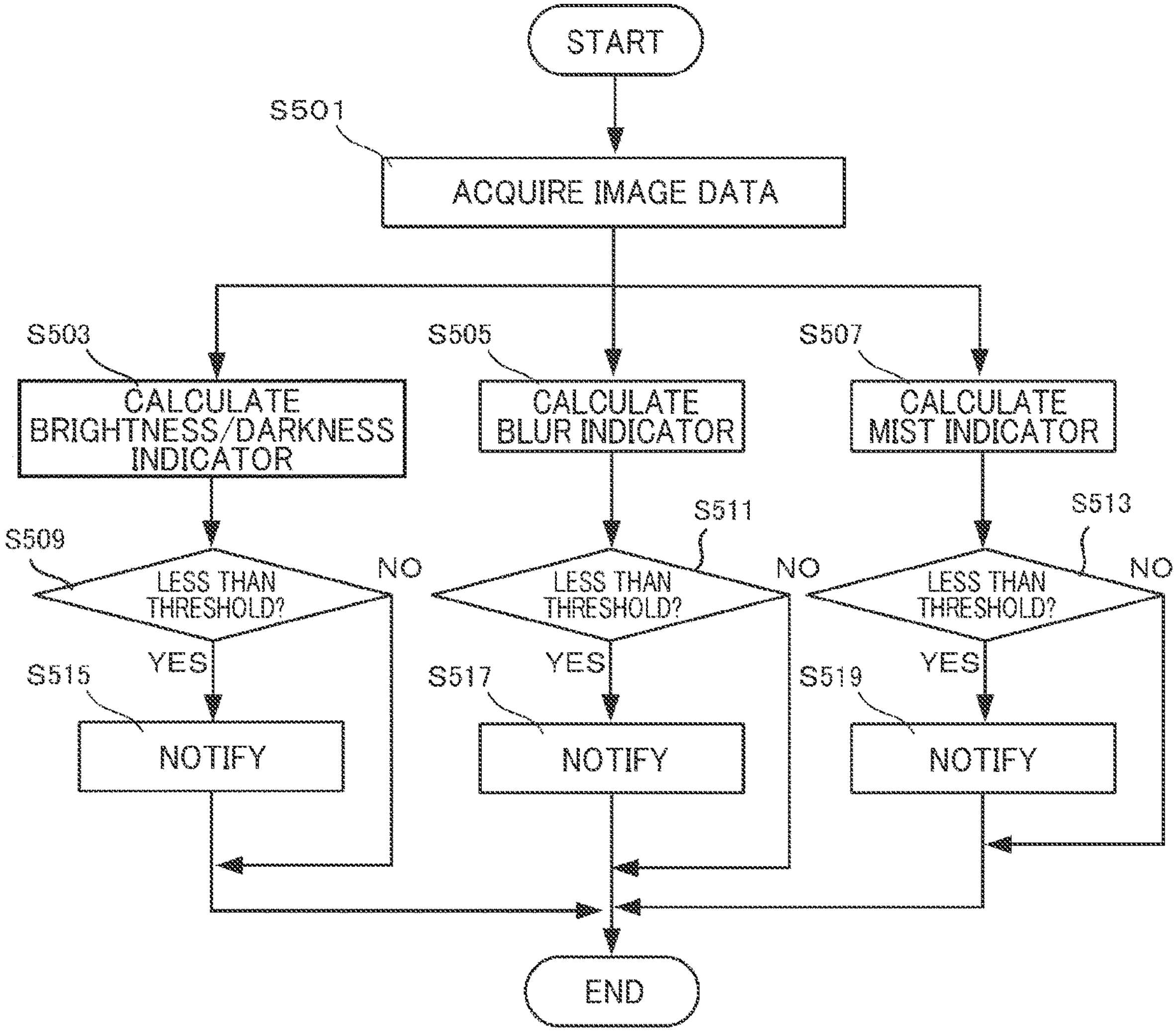
FIG. 5 is a flowchart for explaining the processing flow of the reliability determination unit according to the second embodiment.

FIG. 5 is a flowchart indicating the processing flow in the image reliability determination unit 212.

When image data is acquired in step S501, the image reliability determination unit 212 performs the brightness/darkness indicator calculation processing (S503), the blur indicator calculation processing (S505), and the mist indicator calculation processing (S507) in parallel. Further, in steps S509 to S513, the image reliability determination unit 212 compares the indicators with each of the threshold values in parallel processing, and if any indicator is equal to or less than the threshold value, reads the corresponding notification message 329 from the storage 302 and displays the notification message on the touch panel 303 (S515 to S519).

Figure 7:
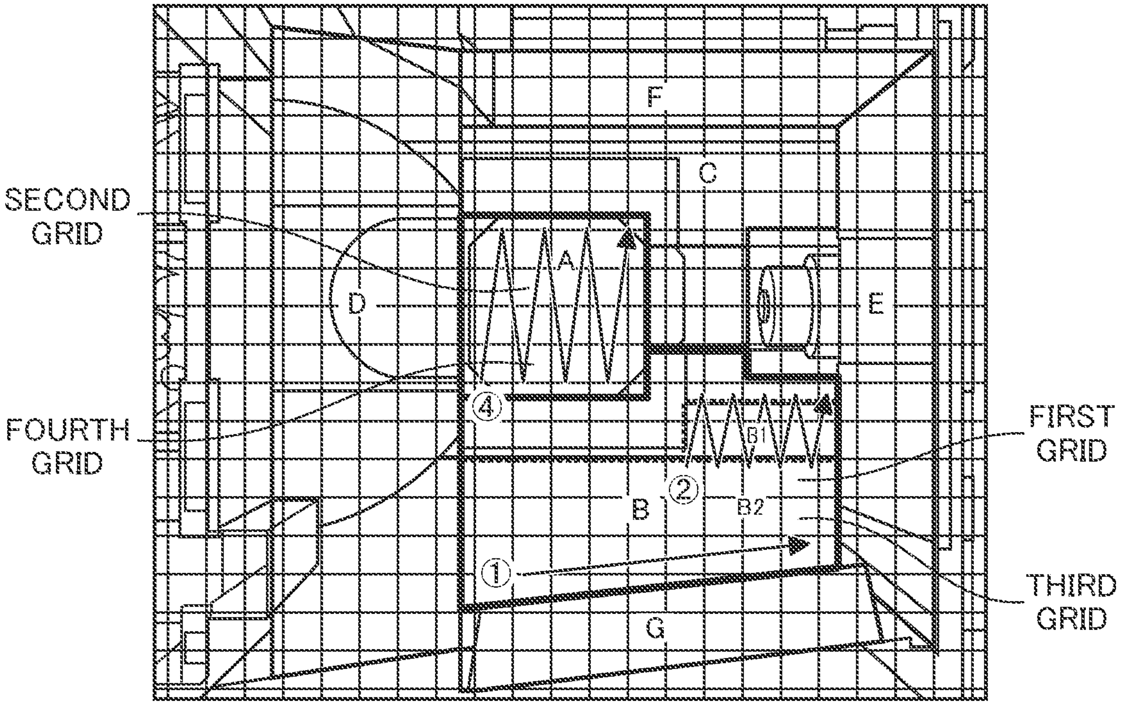
FIG. 7 is a diagram for explaining the state of chip discharge in the machine tool system according to the second embodiment.

The above-described embodiments are summarized as follows. The imaging control unit 312 controls the camera 227 at predetermined timing to acquire image data. The grid dividing unit 313 divides image data into partial images by grids. The area dividing unit 311 divides the image data into a plurality of areas each composed of a plurality of predetermined partial images according to the structures in the machine tool. As shown in FIG. 7, e.g., area A includes the pallet, and area B includes the bottom of the processing area. Each area has a predetermined coolant cleaning path. For example, a zigzag cleaning path is set for the area A. In the area B, a zigzag cleaning path is set for the horizontal surface B1, and a linear cleaning path is set for the inclined surface B2.

The chip processing unit 314 determines the existence probability of chips for each partial image divided into the grids. Further, the chip processing unit 314 calculates a total score related to the accumulation of the object in the entire area for each area corresponding to the structures in the machine tool on the basis of the existence probability of chips in a plurality of partial images included in the area. When the total score for accumulation in any area exceeds a threshold value, the coolant control unit 318 performs control for discharging coolant along the cleaning path of the area. When the total score of area A exceeds the threshold value, coolant is discharged along the zigzag cleaning path for area A. When the total score of the area B exceeds the threshold, coolant is discharged along the zigzag cleaning path of the horizontal surface B1, and then coolant is discharged along the linear cleaning path of the inclined surface B2.

Figure 8:
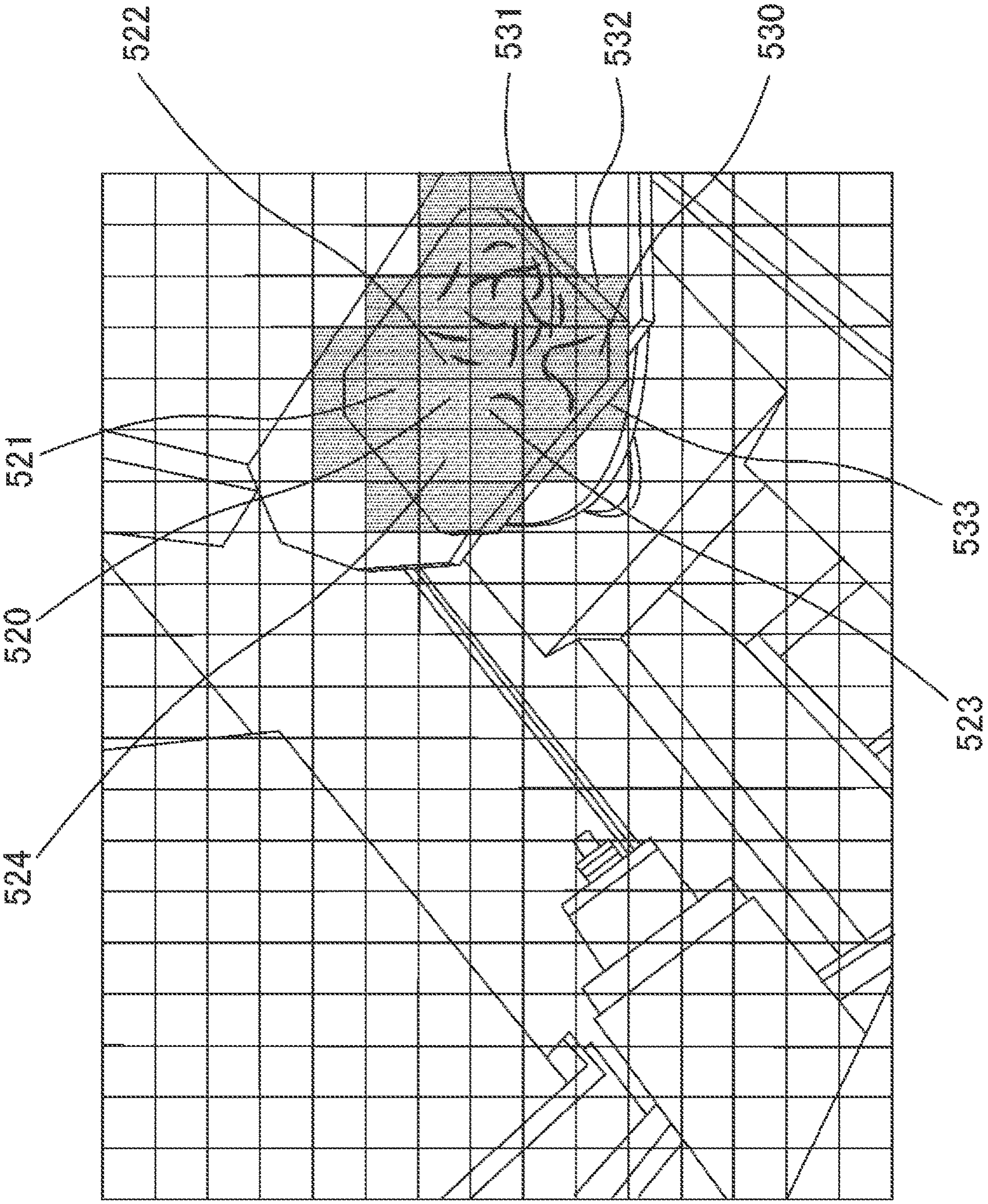
FIG. 8 is a diagram illustrating another example of image data.

FIG. 8 shows another example of image data. Although FIG. 1, FIG. 6, and FIG. 7 show examples of image data imaged from above in the machine tool, image data imaged from obliquely above as shown in FIG. 8 may be used. Referring to FIG. 8, how each area is defined will be described. The information processing device sets the flow method of the fluid for each area, and processes the information so as to move the object by the set flow method of the fluid when the amount of the object in the area exceeds a predetermined amount. The amount of accumulation and the speed of accumulation of the object differ depending on the place such as a table, a pallet, a side wall, and a slope. Therefore, the information processing device preferably defines an area for each member in the image. However, since image processing to identify the members in detail is time consuming, it is preferable to divide the image into grids in advance, and defines a plurality of grids as one aggregate as an area in advance. The method of defining the area will be specifically described below.

First, as shown in FIG. 8, images are divided into grids. The image may be a still image, a video image, or a live image. In FIG. 8, grids are displayed by dotted lines, but the display is optional. In both the case of image data imaged from above and the case of image date imaged from obliquely above, an area corresponding to a structure in the machine tool is defined by a partial image that is selected (hereinafter referred to as a "selected partial image"). The area illustrated in FIG. 8 includes a first selected partial image 520 and a second selected partial image 530. Around the first selected partial image 520, there are a selected partial image 521 adjacent to the upper side of the first selected partial image 520, a selected partial image 522 adjacent to the right side of the same, a selected partial image 523 adjacent to the lower side of the same, and a selected partial image 524 adjacent to the left side of the same. Around the second selected partial image 530, there are a selected partial image 531 adjacent to the upper side of the second selected partial image 530, a selected partial image 532 adjacent to the right side of the same, and a selected partial image 533 adjacent to the left side of the same. The area of the above-described embodiment includes the first selected partial image 520 and the second selected partial image 530. The area of one example of the above-described embodiment includes four selected partial images adjacent to the first selected partial image 520 and three selected partial images adjacent to the second selected partial image 530. That is, an arbitrary shape in the image data can be extracted as an area. Thus, the selected area is "an area formed by selecting a partial image according to the shapes in the machine tool" and is "an area including (i) a selected first selected partial image 520, (ii) four selected partial images adjacent to the selected first selected partial image 520, (iii) a selected second selected partial image 530, and (iv) three selected partial images adjacent to the selected second selected partial image 530". When the selected area corresponds to, e.g., a pallet, it is the area A in FIGS. 8 and 1. In this way, by defining an area formed by combining partial images divided into grids, it is possible to flexibly define an area depending on the configuration of the machine, and to set a flow method in accordance with the structures in the machine. The accepting unit of the information processing device 201 accepts selection of an area including the first selected partial image 520 and the second selected partial image 530. Selection candidate areas and area data associated with the areas with a plurality of partial images may be stored in the storage 302 so that an area including a plurality of partial images can be collectively selected. In this case, the accepting unit of the information processing device 201 accepts selection of the area to which the partial image selected by, e.g., a touch operation on the touch panel 303 (display unit) belongs. For example, an area having a size corresponding to the shape in the machine tool, such as the shape of the pallet 14, can be arbitrarily selected.

Figure 9:
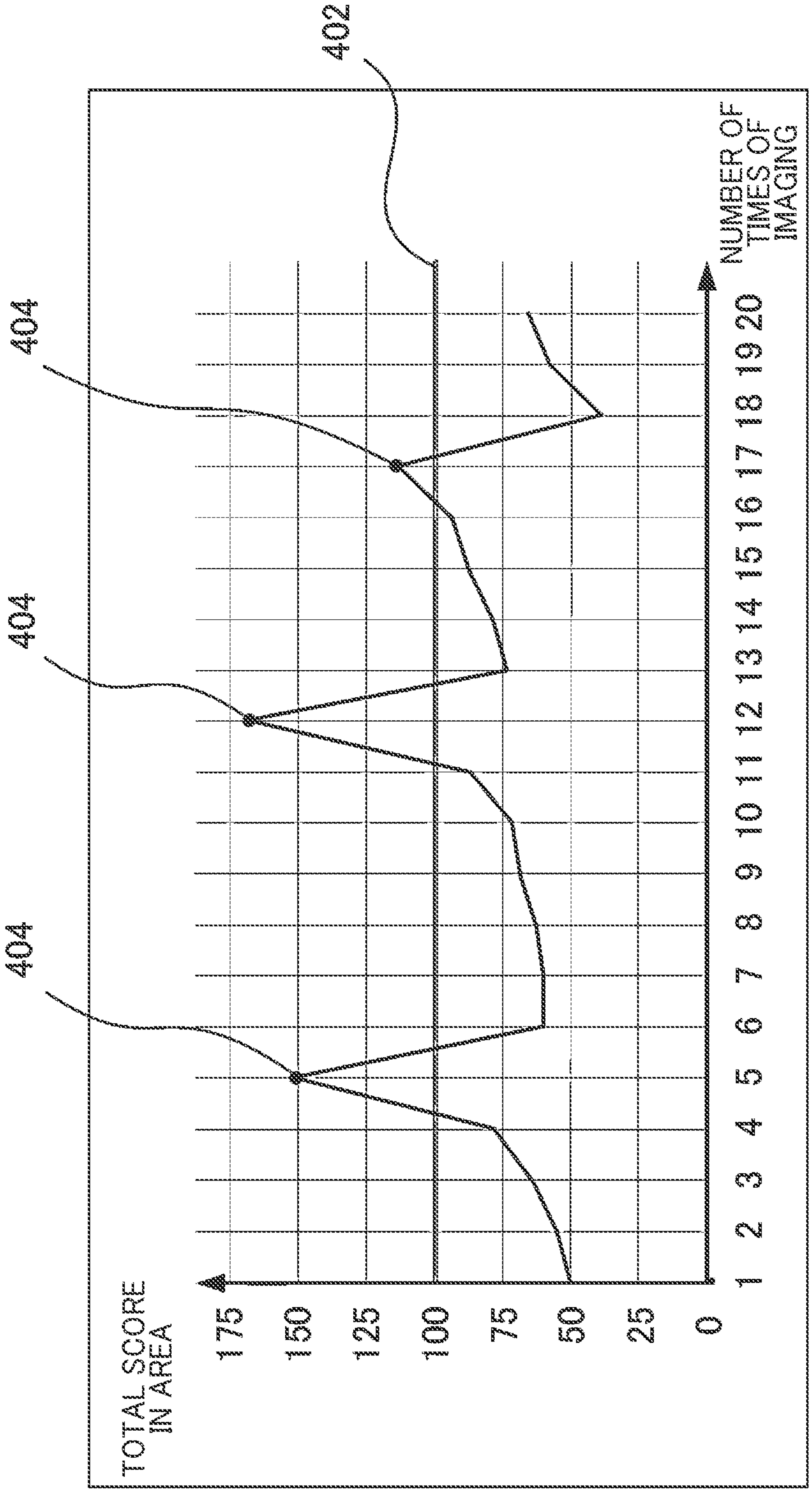
FIG. 9 is a diagram illustrating an example of a score graph screen.

The display control unit 320 of the information processing device 201 may perform processing for displaying the score graph screen illustrated in FIG. 9 on the touch panel 303 (display unit).

As shown in FIG. 9, the score graph screen shows the total score of the area for each imaging in time series. The score graph screen is displayed on the touch panel 303 (display unit). The display control unit 320 instructs the touch panel 303 (display unit) to display the threshold level of the total score on a graph screen representing the total score for each imaging cycle in time series. The score graph screen also displays a threshold line 402 indicating the level of the threshold value. A round mark 404 is displayed on the total score of the area exceeding the threshold value. The machine tool performs cleaning when the total score of the area exceeds the threshold value. In other words, the round mark 404 indicates that cleaning has been performed at that time.

In this example, as shown by the threshold line 402, the threshold value is set to "100". For example, since the total score of the area from the first time to the fourth time does not exceed the threshold value, no cleaning is performed. Therefore, chips increase during that time, and the total score of the areas increases. When the total score of the areas exceeds the threshold at the fifth time, cleaning is performed. Cleaning reduces the chips and reduces the total score of the area at the sixth time. Thus, an increase in the total score of the area during the period in which no cleaning is performed and a decrease in the total score of the area due to cleaning are repeated. The user can easily grasp the state change of the chips in the areas corresponding to the structures in the machine tool by viewing the score graph screen.

According to the present embodiment, it is possible to know whether an image obtained by imaging the inside of the machine tool is suitable for detecting a removal object. The reliability of the detection result of the removal object can be determined, and if the reliability is low, means for solving the problem can be examined. Consequently, the removal object in the machine tool can be detected with higher accuracy.

Others

The present invention may be applied to a system comprising a plurality of devices or to a single device. Further, the present invention is applicable to a case where an information processing program for implementing the function of the embodiment is supplied to a system or a device and executed by a built-in processor. To implement the functions of the present invention by a computer, a program installed in the computer, a medium storing the program, a server for downloading the program, and a processor for executing the program are also included in the technical scope of the present invention. In particular, at least a non-transitory computer readable medium containing a program that causes a computer to perform the processing steps included in the above-described embodiments is within the scope of the present invention.

CROSS REFERENCE TO RELATED APPLICATIONS

This application is a continuation application of International Application No. PCT/JP2021/030012, filed on Aug. 17, 2021, which claims priority to and the benefit of Japanese Patent Application No. 2020-141250, filed on Aug. 24, 2020. The contents of these applications are incorporated herein by reference in their entirety.

What is claimed is:

1. An information processing device comprising:

a memory storing an information processing program; and a processor operating a machine tool including a camera and a fluid discharging device based on the information processing program, wherein the processor performs:

(i) an area dividing process of receiving image data imaged by the camera, dividing a portion of the image data into a plurality of grids including a first grid, a second grid, a third grid, and a fourth grid in advance, and classifying the plurality of grids into a plurality of areas based on structures in the machine tool represented in the image data in advance, so as to classify (a) a first area including the first grid and the third grid and (b) a second area including the second grid and the fourth grid;

(ii) a detecting process of receiving image data imaged after a machining process, and detecting an object with respect to the first grid divided in advance; and (iii) a generating process of, when the object is detected in the first grid, generating a signal for controlling a discharge of a fluid from the fluid discharging device so that the fluid flows through the first grid and the third grid included in the first area, and wherein the plurality of areas are areas divided according to structures in the machine tool.

2. The information processing device according to claim 1, wherein the processor generates the signal when the object is detected in the first grid and a score relating to accumulation of the object in the first area exceeds a threshold value.

3. A machine tool comprising:

a camera imaging an object in the machine tool;

a fluid discharging device discharging a fluid to move the object;

a memory storing an information processing program; and a processor operating the camera and the fluid discharging device based on the information processing program, wherein the processor performs:

(i) an area dividing process of receiving image data imaged by the camera, dividing a portion of the image data into a plurality of grids including a first grid, a second grid, a third grid, and a fourth grid in advance, and classifying the plurality of grids into a plurality of areas based on structures in the machine tool represented in the image data in advance, so as to classify (a) a first area including the first grid and the third grid and (b) a second area including the second grid and the fourth grid;

(ii) a detecting process of receiving image data imaged after a machining process, and detecting the object with respect to the first grid divided in advance; and (iii) a generating process of, when the object is detected in the first grid, generating a signal for controlling the discharge of the fluid from the fluid discharging device so that the fluid flows through the first grid and the third grid included in the first area, and wherein the plurality of areas are areas divided according to structures in the machine tool.

4. The information processing device according to claim 1, further comprising: a cleaning path which is set in each area of the plurality of areas.

5. The machine tool according to claim 3, further comprising: a cleaning path which is set in each area of the plurality of areas.

6. The information processing device according to claim 4, wherein the cleaning path includes a zigzag cleaning path for a horizontal surface and a linear cleaning path for an inclined surface in the machine tool.

7. The machine tool according to claim 5, wherein the cleaning path includes a zigzag cleaning path for a horizontal surface and a linear cleaning path for an inclined surface in the machine tool.

* * * * *